US012695899B2

(12) United States Patent
Zheng et al.

(10) Patent No.: US 12,695,899 B2
(45) Date of Patent: *Jul. 28, 2026

(54) VIDEO IMAGE PROCESSING METHOD AND DEVICE

(71) Applicant: SZ DJI TECHNOLOGY CO., LTD., Shenzhen (CN)

(72) Inventors: Xiaozhen Zheng, Shenzhen (CN); Suhong Wang, Shenzhen (CN); Shanshe Wang, Shenzhen (CN); Siwei Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/958,554

(22) Filed: Nov. 25, 2024

(65) Prior Publication Data

US 2025/0088655 A1     Mar. 13, 2025

Related U.S. Application Data

(63) Continuation of application No. 18/341,246, filed on Jun. 26, 2023, now Pat. No. 12,155,856, which is a
(Continued)

(30) Foreign Application Priority Data

Jan. 3, 2019    (WO) ................ PCT/CN2019/070315

(51) Int. Cl.
*H04N 19/513* (2014.01)
*H04N 19/12* (2014.01)
(Continued)

(52) U.S. Cl.
CPC ........... *H04N 19/513* (2014.11); *H04N 19/12* (2014.11); *H04N 19/136* (2014.11); *H04N 19/176* (2014.11); *H04N 19/587* (2014.11)

(58) Field of Classification Search
None
See application file for complete search history.

(56) References Cited

U.S. PATENT DOCUMENTS 6,480,546 B1    11/2002  Kim et al.
10,362,330 B1    7/2019  Li et al.
(Continued)

FOREIGN PATENT DOCUMENTS

CN    101188772 A    5/2008
CN    101350928 A    1/2009
(Continued)

OTHER PUBLICATIONS

The World Intellectual Property Organization (WIPO) International Search Report for PCT/CN2019/070315 Sep. 27, 2019 5 Pages.
(Continued)

*Primary Examiner* — Christopher G Findley
(74) *Attorney, Agent, or Firm* — ANOVA LAW GROUP, PLLC

(57) ABSTRACT

An encoder includes a memory storing program instructions and a processor configured to execute the program instructions to determine a current image block, turn off a temporal motion vector prediction (TMVP) operation in response to a size of the current image block meeting a preset condition so that a temporal candidate motion vector of the current image block is not determined according to the TMVP operation, and encode the current image block. The TMVP operation includes determining a relevant block of the current image block in a temporal neighboring image, and determining the temporal candidate motion vector of the current image block according to a motion vector of the relevant block.

15 Claims, 2 Drawing Sheets

Determine a current image block                    S110

When a size of the current image block meets a preset condition, determine a temporal candidate motion vector of the current image block according to a temporal motion vector prediction (TMVP) operation and/or an advanced/alternative temporal motion vector prediction (ATMVP) operation                    S120

Related U.S. Application Data continuation of application No. 17/645,143, filed on Dec. 20, 2021, now Pat. No. 11,689,736, which is a continuation of application No. 17/060,011, filed on Sep. 30, 2020, now Pat. No. 11,206,422, which is a continuation of application No. PCT/CN2019/077893, filed on Mar. 12, 2019.

(51) Int. Cl.

| | | |
|---|---|---|
| *H04N 19/136* | (2014.01) | |
| *H04N 19/176* | (2014.01) | |
| *H04N 19/587* | (2014.01) | |

(56) References Cited

U.S. PATENT DOCUMENTS

| | | | |
|---|---|---|---|
| 11,178,420 | B2 | 11/2021 | Wang et al. |
| 11,206,422 | B2 | 12/2021 | Zheng et al. |
| 12,155,856 | B2 * | 11/2024 | Zheng .................... H04N 19/12 |
| 2007/0110156 | A1 | 5/2007 | Ji et al. |
| 2016/0219278 | A1 | 7/2016 | Chen et al. |
| 2016/0286232 | A1 | 9/2016 | Li et al. |
| 2016/0366435 | A1 | 12/2016 | Chien et al. |
| 2017/0034512 | A1 | 2/2017 | Casula |
| 2017/0238005 | A1 | 8/2017 | Chien |
| 2018/0084260 | A1 | 3/2018 | Chien et al. |
| 2018/0199057 | A1 | 7/2018 | Chuang et al. |
| 2020/0077115 | A1 | 3/2020 | Li et al. |
| 2020/0195948 | A1 | 6/2020 | Li et al. |
| 2021/0266589 | A1 | 8/2021 | Chen et al. |

FOREIGN PATENT DOCUMENTS

| | | | |
|---|---|---|---|
| CN | 101573985 | A | 11/2009 |
| CN | 101841712 | A | 9/2010 |
| CN | 101873500 | A | 10/2010 |
| CN | 102148990 | A | 8/2011 |
| CN | 102215395 | A | 10/2011 |
| CN | 102625094 | A | 8/2012 |
| CN | 102939751 | A | 2/2013 |
| CN | 104079944 | A | 10/2014 |
| CN | 104935938 | A | 9/2015 |
| CN | 106537915 | A | 3/2017 |
| CN | 107211156 | A | 9/2017 |
| CN | 108886616 | A | 11/2018 |
| CN | 109005407 | A | 12/2018 |
| CN | 109076236 | A | 12/2018 |
| JP | 2007060693 | A | 3/2007 |
| JP | 2021516502 | A | 7/2021 |
| WO | 2016089933 | A1 | 6/2016 |
| WO | 2018048904 | A1 | 3/2018 |
| WO | 2018058526 | A1 | 4/2018 |
| WO | 2019089933 | A1 | 5/2019 |
| WO | 2020004990 | A1 | 1/2020 |

OTHER PUBLICATIONS

The World Intellectual Property Organization (WIPO) International Search Report for PCT/CN2019/077893 Sep. 16, 2019 5 Pages.

Zhichu He, et al., "Framework of AVS2-VIDEO Coding", ICIP2013, Feb. 13, 2014, p. 1515-1519.

Yuan Yuan, et al., "A New Transform Structure for Geometry Motion Partitioning in Video Coding", Journal of Shanghai University, vol. 19, No. 3, Jun. 2013, p. 240-244.

Tamse (Samsung) A et al: "CE4-related: Redundant Removal for ATMVP", 12. JVET Meeting; Oct. 3, 2018-Oct. 12, 2018; Macao; (The Joint Video Exploration Team of ISO/IEC JTC1/SC29/WG11 and ITU-T SG.16 ), No. JVET-L0055 Oct. 5, 2018 (Oct. 5, 2018).

Leehet Al: "CE4-related: Fixed sub-block size and restriction for ATMVP", 12. JVET Meeting; Oct. 3, 2018-Oct. 12, 2018; Macao; (The Joint Video Exploration Team of ISO/IEC JTC1/SC29/WG11 and ITU-T SG.16 ), No. JVET-L0468 Oct. 1, 2018 (Oct. 1, 2018).

Xiu X et al: "Draft text for advanced temporal motion vector prediction (ATMVP) and adaptive motion vector resolution (AMVR)", 11. JVET Meeting; Jul. 11, 2018-Jul. 18, 2018; Ljubljana; (The Joint Video Exploration Team of ISO/IEC JTC1/SC29/WG11 and ITU-T SG.16 ), No. JVET-K0566 Jul. 18, 2018 (Jul. 18, 2018).

Benjamin Brossetal: "Versatile Video Coding (Draft 2)", The Joint Video Exploration Team of ISO/IEC JTC1/SC29/WG11 and ITU-T SG.16, No. JVET-K1001 Jul. 18, 2018 (Juk, 18, 2018), pp. 1-139.

C-C Chen etal: "CE4-related: A simplification algorithm for ATMVP", 12. JVET Meeting; Oct. 3, 2018-Oct. 12, 2018; Macao; (The Joint Video Exploration Team of ISO/IEC JTC1/SC29/WG11 and ITU-T SG.16 ), No. JVET-L0092 Oct. 3, 2018 (Oct. 3, 2018).

Wang (Peking University) SHet al: "CE4-related: Simplification of ATMVP candidate derivation", 12. JVET Meeting; Oct. 3, 2018-Oct. 12, 2018; Macao; (The Joint Video Exploration Team of ISO/IEC JTC1/SC29/WG11 and ITU-T SG.16 ), No. JVET-L0198 Sep. 26, 2018 (Sep. 26, 2018).

Hahyun Lee, et al. , CE4-related: Fixed sub-block size and restriction for ATMVP , Joint Video Experts Team (JVET) of ITU-T SG 16 WP 3 and ISO/IEC JTC 1/SC 29/WG 11 , JVET-L0468-v2 , 12th Meeting: Macao, CN, Oct. 2018, pp. 1-4.

Jianle Chen, et al. , Algorithm Description of Joint Exploration Test Model 7 (JEM 7) , Joint Video Exploration Team (JVET) of ITU-T SG 16 WP3 and ISO/IEC JTC 1/SC 29/WG 11 , JVET-G1001-v1 , 7th Meeting: Torino, IT, Aug. 2017, pp.i-iv, 1,13-28.

Suhong Wang, et al. , CE4-related: Simplification of ATMVP candidate derivation , Joint Video Experts Team (JVET) of ITU-T SG 16 WP 3 and ISO/IEC JTC 1/SC 29/WG 11 , JVET-L0198_r2 , 12th Meeting: Macao, CN, Jul. 2019, pp. 1-5.

Hyeongmun Jang, et al. , [CE4-2.6 related] Simplified A TMVP with fixed sub-block size. , Joint Video Experts Team (JVET) of ITUTSG 16 WP 3 and ISO/IEC JTC 1/SC 29/WG 11 , JVET-K0080-v1 , Joint Video Experts Team (JVET) of ITU-T SG 16 WP 3 and ISO/IEC JTC 1/SC 29/WG 11, Jul. 2018, pp. 1-5.

M-Wen Chen, and Xianglin Wang , AHG5: Reducing VVC worst-case memory bandwidth by restricting bi-directional 4×4 inter CUs/Sub-blocks , Joint Video Experts Team (JVET) of ITU-T SG 16 WP 3 and ISO/IECJTC 1/SC 29/WG 11 , JVET-L0104 , 12th Meeting: Macao, CN, Sep. 2018, pp. 1-3.

Suhong Wang et al. , CE4-related: Remove redundancy between TMVP and ATMVP , Joint Video Experts Team (JVET) of ITU-T SG 16 WP 3 and ISO/IEC JTC 1/SC 29/WG 11 , JVET-M0345_v2, 13th Meeting: Marrakech, MA, Jan. 2019, pp. 1-5.

Suhong Wang, et al. , CE4-1.5: Remove TMVP merge candidate for the specified blocksizes , Joint Video Experts Team (JVET) of ITU-T SG 16 WP 3 and ISO/IEC JTC 1/SC 29/WG 11 , JVET-No. 212_V2 , 14th Meeting: Geneva, CN, Mar. 2019, pp. 1-6.

* cited by examiner

VIDEO IMAGE PROCESSING METHOD AND DEVICE

CROSS-REFERENCE TO RELATED APPLICATIONS

This application is a continuation of application Ser. No. 18/341,246, filed on Jun. 26, 2023, which is a continuation of application Ser. No. 17/645,143, filed Dec. 20, 2021, now U.S. Pat. No. 11,689,736, which is a continuation of application Ser. No. 17/060,011, filed Sep. 30, 2020, now U.S. Pat. No. 11,206,422, which is a continuation of International Application No. PCT/CN2019/077893, filed Mar. 12, 2019, which claims priority to International Application No. PCT/CN2019/070315, filed Jan. 3, 2019, the entire contents of all of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to video encoding and decoding field, and more particularly, to a video image processing method and a device.

BACKGROUND

At present, a main video coding standard adopts a block-based motion compensation technology in an inter-frame prediction part. The main principle of the block-based motion compensation technology is finding a most similar block in an encoded image for a current image block, and this process is called motion compensation. For example, a frame of image is divided into coding tree units (CTUs) of equal size, e.g., the size is 64×64 or 128×128. Each CTU may be further divided into square or rectangular coding units (CUs). A most similar block is found for each CU in a reference frame as a predicted block of the current CU, where the reference frame is usually a reconstructed frame near a current frame in a time domain. A relative displacement between the current block (i.e., the current CU) and the similar block (i.e., the predicted block of the current CU) is called a motion vector (MV). The process of finding the most similar block in the reference frame as the predicted block of the current block is motion compensation.

In a current prediction mode, a motion information candidate list of the current CU is usually constructed in two ways. One way is determining a candidate motion vector in a spatial domain, which usually includes filling motion information of an encoded neighbouring block of the current CU into the candidate list. The other way is determining a candidate motion vector in a time domain. Temporal motion vector prediction (TMVP) uses motion information of a CU at a corresponding position in an encoded neighbouring image of the current CU. The motion vector of the current CU is determined according to a candidate motion vector in the motion information candidate list, and the prediction block of the current CU is determined according to the motion vector of the current CU.

There is still room for improvement in the current prediction mode.

SUMMARY

In accordance with the disclosure, there is provided a video image processing method including determining a current image block and, in response to a size of the current image block meeting a preset condition, determining a temporal candidate motion vector of the current image block according to at least one of a temporal motion vector prediction (TMVP) operation or an advanced/alternative temporal motion vector prediction (ATMVP) operation. The TMVP operation includes determining a relevant block of the current image block in a temporal neighboring image and determining the temporal candidate motion vector of the current image block according to a motion vector of the relevant block. The ATMVP operation includes determining the relevant block of the current image block in the temporal neighboring image, dividing the current image block into a plurality of sub-blocks, determining a corresponding relevant sub-block in the relevant block for each of the sub-blocks, and determining temporal candidate motion vectors of the sub-blocks of the current image block according to motion vectors of the relevant sub-blocks corresponding to the sub-blocks.

DETAILED DESCRIPTION OF THE EMBODIMENTS

Figure 1:
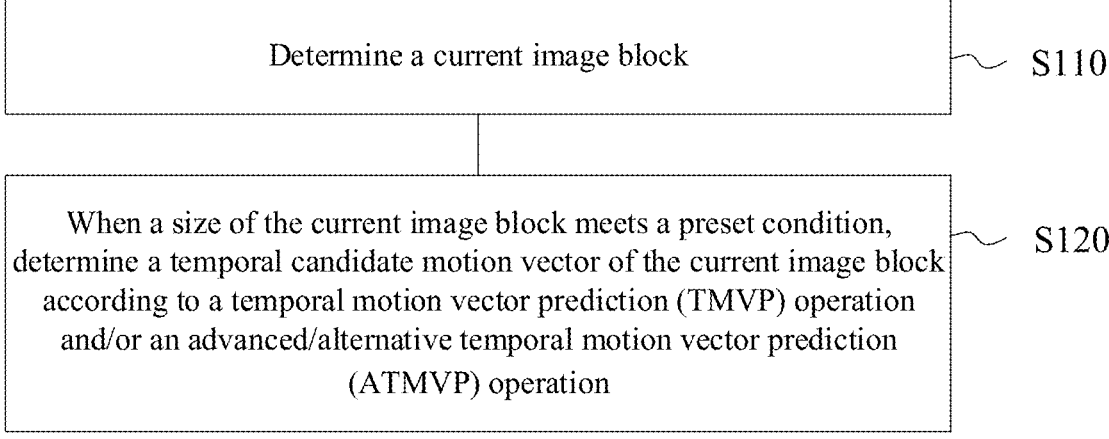
FIG. 1 is a schematic flowchart of a video image processing method according to one embodiment of the present disclosure.

In video encoding and decoding, a prediction process is used to reduce redundant information in an image. A prediction block refers to a basic unit used for prediction in a frame of image. In some standards, the prediction block is also referred to as a prediction unit (PU). Before a frame of image is encoded/compressed, it is divided into a plurality of image blocks. Each image block of the plurality of image blocks can be further divided into a plurality of image blocks, and so on. In different coding methods, the number of division levels can be different, and corresponding operation methods performed are also different. In different coding standards, names of image blocks on a same level may be different. For example, in some video standards, each of a plurality of image blocks that a frame of image is divided into for the first time is referred to as a coding tree unit (CTU). Each coding tree unit may include a coding unit (CU) or may be further divided into a plurality of coding units. A coding unit can be divided into one, two, four or other numbers of prediction units according to a prediction method. In some video standards, the coding tree unit is also referred to as a largest coding unit (LCU).

Prediction refers to finding image data similar to the prediction block and such image data is also referred to as a reference block of the prediction block. A difference between the prediction block and the reference block of the prediction block is encoded/compressed to reduce redundant information during encoding/compression. The difference between the prediction block and the reference block may be a residual obtained by subtracting corresponding pixel values of the prediction block and the reference block. The prediction includes intra prediction and inter prediction. The intra prediction refers to finding the reference block of the prediction block in the frame where the prediction block is located. The inter prediction refers to finding the reference block of the prediction block in other frames except the frame where the prediction block is located.

In some video standards, the prediction unit is the smallest unit in the image and is not further divided into a plurality of image blocks. However, an "image block" or a "current image block" described below refers to a prediction unit (or a coding unit), and an image block can be further divided into a plurality of sub-blocks, and prediction can be further performed on each sub-block. The current image block is an image block to be encoded (or decoded). An image frame where the current image block is located is referred to as a current frame. For example, the current image block is a coding unit (CU) in some video standards.

In the present disclosure, a motion information candidate list is constructed before a current image block is predicted, and the prediction is performed according to selected candidate motion information from the motion information candidate list. The motion information described in the disclosure may include a motion vector, or include a motion vector and information of a reference frame. The motion information candidate list refers to a set of candidate motion information of the current block. The candidate motion information in the motion information candidate list can be stored in a same buffer or in different buffers, which is not limited here. An index of the motion information in the motion information candidate list described below can be an index of the motion information in the set of all the candidate motion information of the current block, or an index of the motion information in the buffer where the motion information is located, and is not limited here.

There can be different types of modes for constructing the motion information candidate list, and examples of the different types of modes are described below.

In a first type of mode, at an encoder side, after a motion information candidate list is constructed, encoding of a current image block can be realized through the following processes.

Best motion information is selected from the motion vector candidate list. The motion vector MV1 of the current image block is determined according to the selected motion information, and an index of the selected motion information in the motion information candidate list is obtained.

According to the motion vector MV1 of the current image block, a predicted image block of the current image block is determined from a reference image (i.e., a reference frame). That is, a position of the predicted image block of the current image block in the reference frame is determined.

A residual between the current image block and the predicted image block is obtained.

The index and the residual obtained in the processes described above are sent to a decoder side.

At the decoder side, the current image block can be decoded through the following processes.

The residual and the index are received from the encoder side.

The motion information candidate list is constructed using a preset method. The preset method can be consistent with method for constructing the motion information candidate list used by the encoder side.

According to the index, motion information is selected from the motion information candidate list and the motion vector MV1 of the current image block is determined according to the selected motion information.

The predicted image block of the current image block is obtained according to the motion vector MV1, and then the current image block is obtained by decoding based on the predicted image block and the residual.

In the first type of mode, the motion vector of the current image block is equal to motion vector prediction (MVP) (such as the above-described motion vector MV1). In some embodiments, the first type of mode includes a merge mode and/or an affine merge mode.

In a second type of mode, a difference from the first type of mode is that after the encoder side selects best motion information from the motion information candidate list and determines a predicted MV of the current image block according to the selected motion information, the encoder side also uses the predicted MV as a search starting point to perform a motion search, and records a displacement between a finally located position and the search starting point as a motion vector difference (MVD). The predicted image block of the current image block is determined from the reference image according to the predicted MV and the MVD. Therefore, the bit stream sent by the encoder side to the decoder side also includes the MVD in addition to the index and the residual in the first type of mode. In some embodiments, the second type of mode can also include advanced motion vector prediction (AMVP mode).

Construction methods of motion information candidate lists in different types of modes can be same or different. Motion information candidate list constructed through a same method can be applied to only one type of mode or different types of modes, which is not limited here. A method for determining one candidate in the motion information candidate list may use only one type of mode or different types of construction modes, which is not limited here.

In accordance with the disclosure, motion information candidate lists obtained through two construction methods are provided. For the convenience of description, the motion information candidate lists obtained through two construction methods are referred to as a first motion vector candidate list and a second motion vector candidate list. One difference between the two lists is that at least one candidate in the first motion vector candidate list includes a motion vector of a sub-block, and each candidate in the second motion vector candidate list includes a motion vector of an image block.

As described above, the image block is a same type as the current image block, referring to a prediction unit (or a coding unit). The sub-block refers to one of a plurality of sub-blocks obtained by dividing the image block. When a candidate in the first motion vector candidate list is used for prediction, a reference block of the current image block is determined according to the candidate, and then a residual between the image block and the reference block is calculated. When a candidate in the second motion vector candidate list is used for prediction, if the candidate selected is a motion vector of a sub-block, a reference block is determined for each sub-block in the current image block according to the candidate, and a residual between each sub-block in the current image block and the corresponding reference block is calculated. The residuals of all sub-blocks are stitched to form a residual of the current image block.

In some embodiments, the second motion vector candidate list of the current image block can be applied to the above-described first type of mode and/or second type of mode. For example, in some video encoding and decoding standards, the second motion vector candidate list may be a normal merge candidate list among the merge candidate lists. In some video encoding and decoding standards, the second motion vector candidate list may be an AMVP candidate list. In some video encoding and decoding standards, the first motion vector candidate list may be an affine merge candidate list among the merge candidate lists. It should be noted that the second motion vector candidate list can also have other names.

It should be noted that the first motion vector candidate list and the second motion vector candidate list formed through the construction methods provided in the disclosure can be applied to the encoder side and the decoder side. That is, the methods provided in this disclosure can be executed by the encoder side or the decoder side.

In some embodiments, during determination of candidates in the first motion vector candidate list and/or the second motion vector candidate list, one of the candidates can be determined according to the TMVP operation and/or advanced/alternative temporal motion vector prediction (ATMVP) operation.

The ATMVP is a motion vector prediction mechanism with a basic idea of performing the motion compensation by obtaining the motion information of a plurality of sub-blocks in the current image block (e.g., current CU). The ATMVP operation introduces the motion information of the plurality of sub-blocks in the current image block as candidates during the construction of the candidate list, e.g., a merge/affine merge candidate list or an AMVP candidate list. A process of the ATMVP technology may include determining a temporal vector by scanning the motion vector candidate list of the current image block or the motion vectors of the neighbouring image blocks of the current image block, dividing the current image block into N×N sub-blocks (e.g., sub-CU), determining a corresponding block of each sub-block in a reference frame according to the temporal vector obtained, and determining the motion vector of each sub-block according to the motion vector of each corresponding block in the reference frame.

For example, during construction of the first motion vector candidate list, the motion vector determined according to the ATMVP operation can be added to the list as a candidate (e.g., as a first candidate). During constructing the second motion vector candidate list, the method may add the motion vector determined according to the TMVP operation to the list as a candidate. For example, the temporal candidate motion vector determined according to the TMVP operation can be added to both the normal merge candidate list and the AMVP candidate list. As another example, the temporal candidate motion vector determined according to the TMVP operation can be added to the normal merge candidate list or the AMVP candidate list.

In some embodiments, the TMVP operation includes determining a relevant block of a current image block in a temporal neighboring image, and determining a temporal candidate motion vector of the current image block according to a motion vector of the relevant block.

In some embodiments, the ATMVP operation includes determining a relevant block of a current image block in a temporal neighboring image, dividing the current image block into a plurality of sub-blocks, determining a relevant sub-block corresponding to each sub-block in the relevant block, and determining a temporal candidate motion vector of the sub-block of the current image block according to a motion vector of the relevant sub-block corresponding to each sub-block.

In some embodiments, the temporal neighboring image described in the TMVP operation and the ATMVP operation can be a reference image with a closest temporal distance to the image where the current image block is located. In some embodiments, the temporal neighboring image can be a reference image preset by the encoder/decoder side. In some embodiments, the temporal neighboring image can be a specified reference image of the current image block in a video parameter set, a sequence header, a sequence parameter set, an image header, an image parameter set, a slice header. For example, the temporal neighboring image may be a co-located frame of the current image block. The co-located frame is a frame set in a slice-level information header for obtaining motion information for prediction. In some scenarios, the co-located frame is also referred to as a collocated picture.

In some embodiments, the relevant block of the current image block may be a co-located block of the current image block. In some video encoding/decoding standards, the relevant block can be referred to as a collocated block or a corresponding block. The co-located block can be an image block with the same position as the current image block in a same frame, or image blocks with a same position difference from the position of the current image block in a same frame.

The methods for determining the relevant block of the current image block in the TMVP operation and the ATMVP operation can be same or different.

In some embodiments, the methods for determining the relevant block of the current image block in the TMVP operation and the ATMVP operation are same and both include determining an image block at a same position in the above-described temporal neighboring image with a specified position in the current image block as the relevant block of the current image block, or determining an image block at a same position in the above describe temporal neighboring image with a specified position spatial neighboring to the current image block as the relevant block of the current image block.

The ATMVP operation and TMVP operation may include determining the relevant block of the current image block by scanning all spatial candidate motion vectors that have been added to the motion vector merge candidate list. Compared with this example, by determining an image block at a same position in the above-described temporal neighboring image with a specified position in the current image block as the relevant block of the current image block, or determining an image block at a same position in the above describe temporal neighboring image with a specified position spatial neighboring to the current image block as the relevant block of the current image block, redundant operations in the TMVP operation and the ATMVP operation can be simplified.

The size of the relevant block of the current image block can be same as the size of the current image block, or the size of the relevant block of the current image block is a default value.

The specified position in the current image block can be any position in the current image block, e.g., any one of an upper left corner point, an upper right corner point, a center point, a lower left corner point, and a lower right corner point of the current image block. The specified position spatial neighboring to the current image block refers to a specified position in the current image other than the current image block, e.g., a specified position neighboring to the current image block.

For example, if the specified position is the upper left corner point of the current image block and the temporal neighboring image has a pixel point at the same position as the upper left corner point of the current image block, an encoded/decoded block where the pixel is located can be determined as the relevant block of the current image block, or an image block with the pixel as the upper left corner point and with a same size as the current image block or a preset size may be determined as the relevant block of the current image block.

In an example of the ATMVP operation, a frame-level adaptive setting can be performed on the size of the sub-block. The size of the sub-block is 4×4 by default and is set to 8×8 when a specific condition is met. For example, at the encoder side, when the current image block is encoded, an average block size of each sub-block in the CU during a previous encoded image block in a same time domain being encoded in the ATMVP mode is calculated. If the average block size is greater than a threshold, the size of the sub-block of the current image block is set to 8×8, otherwise the default value 4×4 is set. In a new generation versatile video coding (VVC) standard, a motion vector is stored in a size of 8×8. It should be noted that when the size of the sub-block is set to 4×4, the size of the motion vector of the sub-block (also 4×4) does not adapt to a storage granularity of the motion vector in the existing standard. In this ATMVP operation example, when the current image block is encoded, size information of the sub-block of the previous encoded image block at the same time domain may also need to be stored.

In another example of the ATMVP operation, the current image block is a CU, and a sub-block obtained by dividing the current image block can be referred to as a sub-CU. In some embodiments, the size of the sub-block and/or the size of the relevant block of the sub-block are set to be greater than or equal to 64 pixels. In some embodiments, the size of the sub-block and/or the size of the relevant block of the sub-block are both set to 8×8 pixels. Setting the size of the sub-block of the current image block to 8×8 can adapt to the storage granularity of the motion vector specified in the video standard VVC. On the other hand, the size information of the sub-block of the previous encoded image block does not need to be stored, and hence a storage space can be saved.

It should be noted that, provided that the size of the sub-block and/or the size of the relevant block of the sub-block is set to be equal to 64 pixels, the size of the sub-block and/or the size of the relevant block of the sub-block may have different dimensions. For example, the size of the sub-block and/or the size of the relevant block of the sub-block are A×B, where A≤64, B≤64, and A and B are both integer multiples of 4. Further, for example, the size of the sub-block and/or the size of the relevant block of the sub-block are 4×16 pixels, or 4×16 pixels.

In some embodiments, the storage granularity of the motion vector may not be 8×8, but other values. In some embodiments, the size of the sub-block of the current image block is set to be same as the granularity of the motion vector, which is x×y, and x and y are positive integers.

In some embodiments, during determination of a candidate of the current block in the first motion vector candidate list and/or the second motion vector candidate list, if the size of the current image block meets a preset condition, a temporal candidate motion vector of the image block in the first motion vector candidate list and/or the second motion vector candidate list is determined according to the ATMVP operation.

In some embodiments, during determination of a candidate of the current block in the first motion vector candidate list and/or the second motion vector candidate list, if the size of the current image block does not meet the preset condition, the ATMVP operation is turned off, that is, the ATMVP operation is not used to determine the temporal candidate motion vector of the image block in the first motion vector candidate list and/or the second motion vector candidate list.

In some embodiments, during determination of a candidate of each image block in the first motion vector candidate list and/or the second motion vector candidate list, if the size of the current image block meets a preset condition, a temporal candidate motion vector of the image block in the first motion vector candidate list and/or the second motion vector candidate list is determined according to the TMVP operation.

In some embodiments, during determination of a candidate of each image block in the first motion vector candidate list and/or the second motion vector candidate list, if the size of the current image block does not meet the preset condition, the TMVP operation is turned off, that is, the TMVP operation is not used to determine the temporal candidate motion vector of the image block in the first motion vector candidate list and/or the second motion vector candidate list.

In at least one of the above four implementation methods, the preset condition can include one condition or a combination of a plurality of conditions. For example, when the size of the current image block meets a first set of conditions, the temporal candidate motion vector of the current image block is determined through the ATMVP operation. When the size of the current image block meets a second set of conditions, the temporal candidate motion vector of the current image block is determined through the TMVP operation. The number of conditions in the first set of conditions is at least one. The number of conditions in the second set of conditions is at least one. The first set of conditions and the second set of conditions can be completely same, or completely different, or partially same.

In some embodiments, the size of the current image block is x1×y1, and the default size of the sub-block of the current image block is x2×y2, where x1, x2, y1, and y2 are all positive integers. The preset condition includes x1 being not smaller than x2 and/or y1 being not smaller than y2. For example, when x1 is not smaller than x2 and/or y1 is not smaller than y2, the temporal candidate motion vector of the current image block is determined through the ATMVP operation and/or the TMVP operation.

In some embodiments, when x1 is smaller than or equal to x2 and/or y1 is smaller than or equal to y2, it is set not to perform the ATMVP operation. For example, when the above-described first motion vector candidate list is constructed, none of the added motion vector candidates is determined through the ATMVP operation.

In some embodiments, the size of the current image block is x1×y1, and a preset size is x3×y3, where x1, x3, y1, and y3 are all positive integers. The preset condition includes x1 being not smaller than x3 and/or y1 being not smaller than y3. For example, when x1 is not smaller than x3 and/or y1 is not smaller than y3, the temporal candidate motion vector of the current image block is determined through the ATMVP operation and/or the TMVP operation.

In some embodiments, when x1 is smaller than or equal to x3 and/or y1 is smaller than or equal to y3, it is set not to perform the TMVP operation. The reason to skip the TMVP operation is that, in a hardware design, it is usually required that processing areas with a same size complete encoding or decoding at about same time, and therefore a running time needed for an area that contains relatively many small blocks is much longer than other areas. Reducing the running time of small blocks is very meaningful for hardware parallel processing. When the size of the current image block is relatively small, skipping the TMVP operation can reduce the running time of the small blocks. In addition, coding technologies use temporal correlation more and more often and many temporal prediction technologies, e.g., ATMVP, are adopted, and hence for small blocks, a performance impact of skipping the TMVP is negligible.

In this disclosure, when the TMVP operation is not performed or is skipped, if the motion information candidate list of the first type of mode and the second type of mode both use the TMVP operation to determine a candidate, the TMVP operation can be only skipped in the motion information candidate list of the first type of mode or only skipped in the motion information candidate list of the second type of mode, or the TMVP operation can be skipped in both of the motion information candidate lists of the first type of mode and the second type of mode.

In some embodiments, the storage granularity of the motion vector is x3×y3.

In some embodiments, when the size of the current image block is same as a first default size, only one of the TMVP operation and the ATMVP operation is performed. For example, it is set not to perform the ATMVP operation or not to perform the TMVP operation. For example, only the ATMVP operation is performed. For example, it is set not to perform the TMVP operation. In some embodiments, the first default size may be same as the size of the storage granularity of the motion vector. When the size of the current image block is same as the first default size, the ATMVP technology and the TMVP technology have some redundancy, and both technologies export a set of temporal motion information for the current image block. A redundant operation can be avoided by setting not to perform one of the operations, which can effectively save coding and decoding time. In some embodiments, the ATMVP technology uses a candidate motion vector in an existing merge list of the current image block during exporting. On the other hand, the TMVP technology exports a candidate motion vector directly from a fixed position in a neighboring encoded image. The motion vector exported by the ATMVP technology is more valid and adaptive than the motion vector exported by the TMVP technology, and it is set not to perform the TMVP operation.

In some embodiments, when the current image block contains a storage granularity of one motion vector, that is, when the size of the current image block can cover the storage granularity of one motion vector, the temporal candidate motion vector of the current image block is determined through the ATMVP operation and/or the TMVP operation.

In some embodiments, when the current image block cannot contain the storage granularity of one motion vector or the size of the current image block is equal to the storage granularity of one motion vector, it is set not to perform the TMVP operation. Specifically, the TMVP technology exports a set of temporal motion information, and when the current image block cannot contain the storage granularity of one motion vector, the exported motion vector may be the same, causing an unnecessary division operation.

In some embodiments, the preset condition includes the number of pixels of the current image block is greater than or equal to a preset value. In some embodiments, when the number of pixels of the current image block is smaller than or equal to the preset value, the TMVP operation and/or the ATMVP operation are not performed. The preset value can be 32 or 64.

In some embodiments, if a width or a height of a current CU block is smaller than 8, if the width and the height of the current CU block are both equal to 8, and if the width or the height of the current CU block is smaller than 8 or the width and the height of the current CU block are both equal to 8, it is set not to perform the TMVP operation, thereby avoiding the redundant operation and effectively saving coding and decoding time.

In some embodiments, during a process of constructing the second motion vector candidate list of the current image block, the TMVP operation process is turned off, that is, the TMVP technology is not used to determine a temporal candidate motion vector to be added to the second motion vector candidate list. Specifically, other operations related to the temporal motion information are added, e.g., ATMVP operation, history-based motion vector prediction (HMVP) operation, etc., and an effect of the TMVP technology in the current construction process is greatly reduced, which has a redundancy with the above-described technologies, that is, same motion information may be exported in some cases, causing the construction process of the candidate list to be too complicated and inefficient. In some embodiments, the TMVP process is turned off during a process of constructing the merge motion vector candidate list of the current image block. In this case, temporal related information is still effectively used, and the construction process of the merge candidate list is simpler, thereby reducing complexity of the encoder side and the decoder side.

In a motion compensation prediction process, previous mainstream video coding standards only use a translational motion model. In practice, too many forms of motion exist, e.g., zoom in/out, rotation, long-range motion and other irregular motions. In order to improve an efficiency of inter-frame prediction, an affine motion compensation model may be induced into the coding and decoding technology. The affine motion compensation describes an affine motion field of the image block through MVs of a set of control points. In some embodiments, the affine motion compensation model adopts a four-parameter affine model, and the set of control points includes two control points (e.g., upper left corner point and upper right corner point of the image block). In some embodiments, the affine motion compensation model adopts a six-parameter affine model, and the set of control points includes three control points (e.g., upper left corner point, upper right corner point, and lower left corner point of the image block).

In some embodiments, when the first motion vector candidate list is constructed, the added candidate may be an MV of a set of control points, or referred to as control point motion vector prediction (CPMVP). In some embodiments, the first motion vector candidate list can be used in merge mode. Specifically, the mode may be referred to as affine merge mode, and the first motion vector candidate list can be referred to as affine merge candidate list correspondingly. In the affine merge mode, the prediction in the first motion vector candidate list is directly used as the control point motion vector (CPMV) of the current image block, that is, the affine motion prediction process is not needed.

In some embodiments, a candidate determined according to the ATMVP technology can be added to the first motion vector candidate list.

In some embodiments, a group of control point motion vectors of the relevant block of the current image block is added to the first motion vector candidate list as a candidate. When the candidate in the first motion vector candidate list is used for prediction, the current image block is predicted according to the group of control point motion vectors of the relevant block of the current image block.

In some embodiments, as described above, a representative motion vector of the relevant block of the current image block is added to the first motion vector candidate list as a candidate. Further, in some embodiments, the candidate is marked as determined according to the ATMVP technology. When the candidate in the first motion vector candidate list is used for prediction, the relevant block of the current image block is determined according to the mark and the candidate. The current image block and the relevant block are divided into a plurality of sub-blocks through a same method, and each sub-block in the image block is corresponding to each sub-block in the relevant block. The motion vector of the corresponding sub-block in the current image block is separately predicted according to the motion vector of each sub-block in the relevant block.

In some embodiments, if the relevant block has a sub-block for which a motion vector cannot be obtained, the representative motion vector of the relevant block is used to replace the unobtainable motion vector to predict the corresponding sub-block in the current image block. Further, in some embodiments, if the representative motion vector of the relevant block cannot be obtained, the candidate determined according to the ATMVP technology is abandoned to be added to the second motion vector candidate list. In some embodiments, when the sub-block in the relevant block cannot be obtained, or the sub-block in the relevant block adopts an intra-coding mode, it is determined that the relevant block has a sub-block for which a motion vector cannot be obtained.

In some embodiments, each candidate in the first motion vector candidate list includes motion vectors of a set of control points. When the representative motion vector of the relevant block of the current image block is added to the first motion vector candidate list, in order to ensure that a data format is consistent, the representative motion vector of the relevant block can be inserted as a motion vector of each control point in the candidate, that is, the motion vector of each control point in the candidate is assigned with the representative motion vector of the relevant block.

In some embodiments, the representative motion vector of the relevant block of the current image block may refer to a motion vector of a center position of the relevant block, or other motion vectors representing the relevant block, which is not limited here.

As shown in FIG. 1, there is provided a video image processing method according to one embodiment of the present disclosure. The method includes the following processes.

At S110, a current image block is determined.

At S120, when a size of the current image block meets a preset condition, a temporal candidate motion vector of the current image block is determined according to a temporal motion vector prediction (TMVP) operation and/or an advanced/alternative temporal motion vector prediction (ATMVP) operation.

The TMVP operation includes determining a relevant block of the current image block in a temporal neighboring image, and determining a temporal candidate motion vector of the current image block according to a motion vector of the relevant block.

The ATMVP operation includes determining a relevant block of the current image block in a temporal neighboring image, dividing the current image block into a plurality of sub-blocks, determining a relevant sub-block corresponding to each sub-block in the relevant block, and determining a temporal candidate motion vector of the sub-block of the current image block according to a motion vector of the relevant sub-block corresponding to each sub-block.

The above description may be referred to for the video image processing method shown in FIG. 1, which will not be repeated here.

The method embodiment of the present disclosure is described above with reference to FIG. 1, and the device embodiment corresponding to the method embodiment is described below. It should be noted that the description of the device embodiment and the description of the method embodiment correspond to each other, and the above-described method embodiments can be referred to for contents that are not described in detail, which will not be repeated here for brevity.

Figure 2:
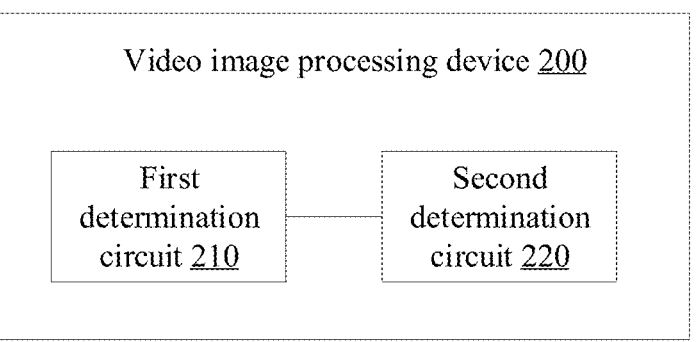
FIG. 2 is a schematic block diagram showing a video image processing device according to one embodiment of the present disclosure.

FIG. 2 is a schematic block diagram showing a video image processing device 200 according to one embodiment of the present disclosure. The device 200 is configured to execute the method embodiment shown in FIG. 1, and includes a first determination circuit 210 and a second determination circuit 220. The first determination circuit 210 is configured to determine a current image block. The second determination circuit 220 is configured to determine a temporal candidate motion vector of the current image block according to a temporal motion vector prediction (TMVP) operation and/or an advanced/alternative temporal motion vector prediction (ATMVP) operation when a size of the current image block meets a preset condition.

The TMVP operation includes determining a relevant block of the current image block in a temporal neighboring image, and determining a temporal candidate motion vector of the current image block according to a motion vector of the relevant block.

The ATMVP operation includes determining a relevant block of the current image block in a temporal neighboring image, dividing the current image block into a plurality of sub-blocks, determining a relevant sub-block corresponding to each sub-block in the relevant block, and determining a temporal candidate motion vector of the sub-block of the current image block according to a motion vector of the relevant sub-block corresponding to each sub-block.

It should be noted that the first determination circuit and the second determination circuit in the embodiment may be implemented by one or more processors.

The embodiments of the present disclosure also provide a video image processing device that may be configured to execute the method embodiments described above. The device includes a processor and a memory. The memory is configured to store program instructions. The processor is configured to execute the program instructions stored in the memory, and the execution of the program instructions causes the processor to perform the method according to the above-described method embodiments.

In some embodiments, the device may also include a communication interface for communicating with an external device. For example, the processor is configured to control the communication interface to receive and/or send a signal.

The device provided in this disclosure can be provided at an encoder or a decoder.

Figure 3:
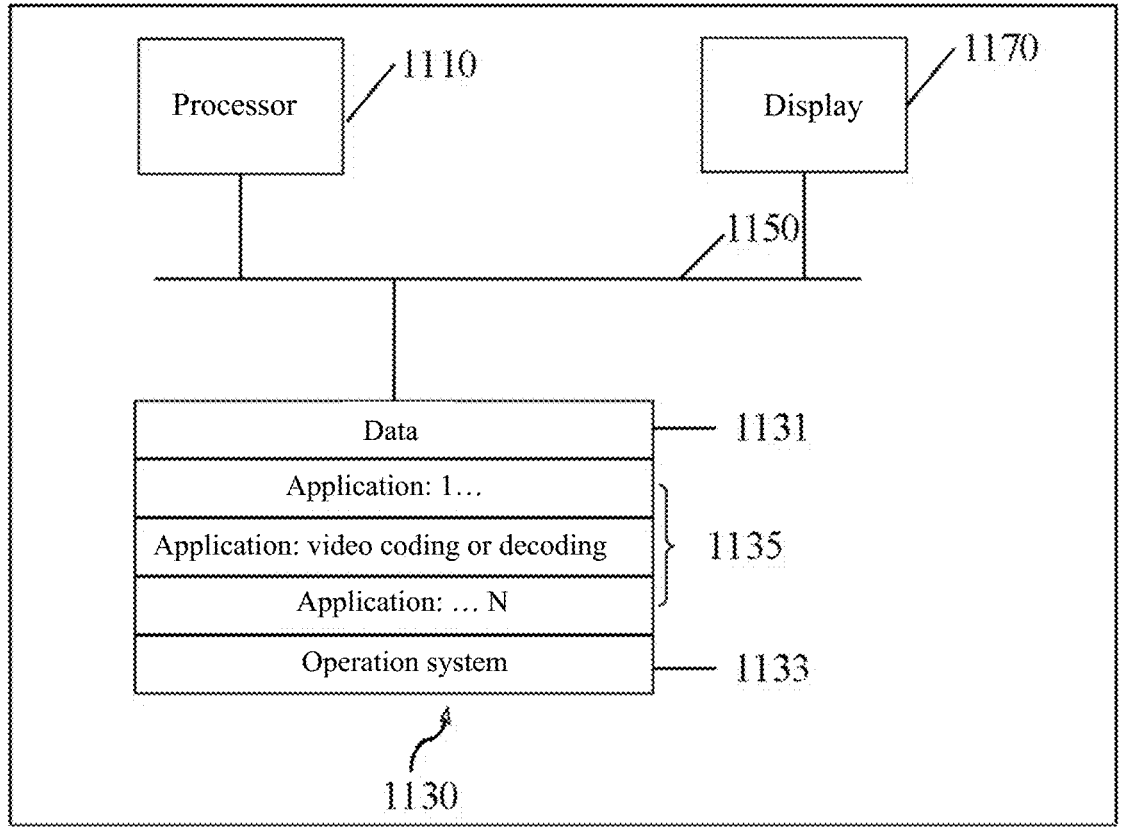
FIG. 3 is a schematic block diagram showing an implementation of an encoding device or a decoding device according to one embodiment of the present disclosure.

FIG. 3 is a schematic block diagram showing an example implementation of a coding device 1100 (such as an encoding device or a decoding device) consistent with the disclosure. The coding device 1100 includes a processor 1110, a memory 1130, and a bus system 1150. The processor and the memory are connected via the bus system. The memory is configured to store program instruction. The processor is configured to execute the program instructions stored in the memory. The processor can call the program instructions stored in the memory to implement various video encoding or decoding methods consistent with the present disclosure, e.g., the inter-frame prediction method consistent with the present disclosure, which will not be repeated here.

In some embodiments, the processor 1110 may be a CPU, a general-purpose processor, a DSP, an ASIC, an FPGA, a programmable logic device, a discrete gate or transistor logic device, or a discrete hardware device, etc. The general-purpose processor can be, e.g., a microprocessor.

The memory 1130 may include a ROM, a RAM, or any other suitable type of storage device. The memory 1130 may contain code and data 1131 that can be accessed by the processor 1110 through the bus 1150. The memory 1130 further contains an operation system 1133 and an application program 1135, and the application program 1135 includes at least one program that allows the processor 1110 to execute the video encoding or decoding method consistent with the present disclosure, e.g., the inter-frame prediction method consistent with the present disclosure. For example, as shown in FIG. 3, the application program 1135 includes applications 1 to N, which include a video encoding or decoding application (also referred to as a video coding application) that, when executed, cause the video encoding or decoding method consistent with the present disclosure to be performed.

In addition to a data bus, the bus system 1150 may also include at least one of a power bus, a control bus, or a status signal bus, etc. Various buses are labeled as the bus system 1150 in FIG. 3.

In some embodiments, the coding device 1100 may also include one or more output devices, e.g., a display 1170. In some embodiments, the display 1170 may be a touch-sensitive display that combines the display with a touch-sensitive device operable to sense a touching input. The display 1170 is connected to the processor 1110 through the bus 1150.

The embodiments of the present disclosure also provide a computer-readable storage medium storing a computer program. The execution of the computer program by a computer causes the computer to perform the method provided in the above-described method embodiments.

In some embodiments, it may be implemented in whole or in part by software, hardware, firmware, or any combination thereof. When implemented in software, it may be implemented in whole or in part in the form of a computer program product including one or more computer instructions. When computer instructions are loaded and executed on a computer, all or part of the processes or functions according to the embodiments of the present disclosure are generated. The computer may be a general-purpose computer, a special purpose computer, a computer network, or other programmable device. Computer instructions may be stored in a computer-readable storage medium or transmitted from one computer-readable storage medium to another computer-readable storage medium. For example, computer instructions can be transmitted from a website, a computer, a server, or a data center to another website, computer, server, or data center through wired (e.g., coaxial cable, optical fiber, digital subscriber line (i.e., DSL)) or wireless (e.g., infrared, wireless, microwave, etc.). A computer-readable storage medium may be any usable media that can be stored and read by a computer or a data storage device such as a server or a data center etc. containing one or more usable media integrations. An usable media can be a magnetic media (e.g., floppy disk, hard disk, magnetic tape), an optical media (e.g., high-density digital video disc, i.e., DVD), or a semiconductor media (e.g., solid state disk, i.e., SSD), etc.

Those skilled in the art can realize that the units and algorithm steps of each example described in connection with the embodiments disclosed herein can be implemented by electronic hardware, or a combination of computer software and electronic hardware. Whether these functions are implemented by hardware or software depends on the specific application and design constraints of the technical solution. Professionals can use different methods to implement the described functions for each specific application, but such implementation should not be considered beyond the scope of this specification.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

The present disclosure has been described with the above embodiments, but the technical scope of the present disclosure is not limited to the scope described in the above embodiments. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the claims.

What is claimed is:

1. An encoder comprising:
a memory storing program instructions; and
a processor configured to execute the program instructions to:
determine a current image block;
in response to a size of the current image block meeting a preset condition, turn off a temporal motion vector prediction (TMVP) operation so that a temporal candidate motion vector of the current image block is not determined according to the TMVP operation; and
encode the current image block;
wherein the TMVP operation includes:
determining a relevant block of the current image block in a temporal neighboring image; and
determining the temporal candidate motion vector of the current image block according to a motion vector of the relevant block.

2. The encoder of claim 1, wherein the preset condition includes that a number of pixels of the current image block is:

less than a preset number, or less than or equal to a preset number.

3. The encoder of claim 2, wherein the preset number is 32.

4. The encoder of claim 1, wherein the processor is further configured to execute the program instructions to, when turning off the TMVP operation so that the temporal candidate motion vector of the current image block is not determined according to the TMVP operation:

turn off the TMVP operation in a motion information candidate list of a first type of mode or in a motion information candidate list of a second type of mode; or turn off the TMVP operation in the motion information candidate list of the first type of mode and in the motion information candidate list of the second type of mode.

5. The encoder of claim 4, wherein:

the first type of mode includes merge mode and/or affine merge mode; and/or the second type of mode includes advanced motion vector prediction (AMVP) mode.

6. A decoder comprising:

a memory storing program instructions; and a processor configured to execute the program instructions to:

determine a current image block;

in response to a size of the current image block meeting a preset condition, turn off a temporal motion vector prediction (TMVP) operation so that a temporal candidate motion vector of the current image block is not determined according to the TMVP operation; and decode the current image block;

wherein the TMVP operation includes:

determining a relevant block of the current image block in a temporal neighboring image; and determining the temporal candidate motion vector of the current image block according to a motion vector of the relevant block.

7. The decoder of claim 6, wherein the preset condition includes that a number of pixels of the current image block is:

less than a preset number, or less than or equal to a preset number.

8. The decoder of claim 7, wherein the preset number is 32.

9. The decoder of claim 6, wherein the processor is further configured to execute the program instructions to, when turning off the TMVP operation so that the temporal candidate motion vector of the current image block is not determined according to the TMVP operation:

turn off the TMVP operation in a motion information candidate list of a first type of mode or in a motion information candidate list of a second type of mode; or turn off the TMVP operation in the motion information candidate list of the first type of mode and in the motion information candidate list of the second type of mode.

10. The decoder of claim 9, wherein:

the first type of mode includes merge mode and/or affine merge mode; and/or the second type of mode includes advanced motion vector prediction (AMVP) mode.

11. A bitstream generation method comprising:

determining a current image block;

in response to a size of the current image block meeting a preset condition, turning off a temporal motion vector prediction (TMVP) operation so that a temporal candidate motion vector of the current image block is not determined according to the TMVP operation;

encoding the current image block; and generating a bitstream;

wherein the TMVP operation includes:

determining a relevant block of the current image block in a temporal neighboring image; and determining the temporal candidate motion vector of the current image block according to a motion vector of the relevant block.

12. The method of claim 11, wherein the preset condition includes that a number of pixels of the current image block is:

less than a preset number, or less than or equal to a preset number.

13. The method of claim 12, wherein the preset number is 32.

14. The method of claim 11, wherein turning off the TMVP operation so that the temporal candidate motion vector of the current image block is not determined according to the TMVP operation includes:

turning off the TMVP operation in a motion information candidate list of a first type of mode or in a motion information candidate list of a second type of mode; or turning off the TMVP operation in the motion information candidate list of the first type of mode and in the motion information candidate list of the second type of mode.

15. The method of claim 14, wherein:

the first type of mode includes merge mode and/or affine merge mode; and/or the second type of mode includes advanced motion vector prediction (AMVP) mode.

* * * * *